(12) United States Patent
Gabriel (10) Patent No.: US 12,550,833 B2
(45) Date of Patent: Feb. 17, 2026

(54) SYSTEM AND METHOD FOR CREATING AND SUSTAINING A COOL MICROCLIMATE IN AN ARTIFICIAL VALLEY, AND USE OF STRUCTURE FOR VALORIZATION AND REMEDIATION OF BAUXITE RESIDUE

(71) Applicant: United Arab Emirates University, Al Ain (AE)

(72) Inventor: Elke Gabriel, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/659,439

(22) Filed: May 9, 2024

(65) Prior Publication Data
US 2025/0344647 A1  Nov. 13, 2025

(51) Int. Cl.
*A01G 9/24* (2006.01)

(52) U.S. Cl.
CPC .................... *A01G 9/246* (2013.01)

(58) Field of Classification Search
CPC ........ A01G 9/246; A01G 31/02; A01G 9/023; A01G 9/14; Y02A 40/25; Y02A 40/10; Y02A 40/76; E04F 10/10; E04B 7/163
See application file for complete search history.

(56) References Cited

U.S. PATENT DOCUMENTS

| | | | | |
|---|---|---|---|---|
| 1,990,838 A | * | 2/1935 | Nemec | E04B 7/14 52/80.1 |
| 2,046,601 A | * | 7/1936 | Atkinson | A01G 9/222 160/176.1 R |
| 3,869,826 A | * | 3/1975 | Fischer | A01G 9/246 47/17 |
| 4,195,441 A | * | 4/1980 | Baldwin | A01G 9/243 47/17 |
| 4,198,953 A | * | 4/1980 | Power | A01G 9/243 126/621 |
| 4,226,815 A | * | 10/1980 | Cockman | F28C 1/02 261/109 |
| 5,519,965 A | * | 5/1996 | Robinson | A01G 13/0206 47/31 |
| 5,755,858 A | * | 5/1998 | Barnett | C05D 9/00 71/903 |

(Continued)

*Primary Examiner* — Andrea M Valenti
(74) *Attorney, Agent, or Firm* — MH2 Technology Law Group, LLP (57) ABSTRACT

There is disclosed an artificial valley and a method for maintaining a cool microclimate for agricultural, recreational, and residential purposes. It features a symmetrical or asymmetrical landform of a valley with terraced inner slopes, covered with a shading roof made of parallel reflective panels. The terraces and the base of the valley are covered with a layer of soil which may be used for cultivation of plants, as well as recreational or residential purposes involving irrigation. Inner vertical walls are equipped with light-reflecting surfaces for diffusing light onto the terraces. A cooling system maintains a temperature gradient by injecting fresh, cool air at the base of the valley. The cooling system includes a cooling tower with forced ventilation for evaporative cooling of leachate from the terraces, which is then sprinkled on the injected air. Waste material like bauxite residue may be used as a filling material for the valley.

20 Claims, 9 Drawing Sheets

(56) References Cited

U.S. PATENT DOCUMENTS

| | | | |
|---|---|---|---|
| 2009/0018800 A1* | 1/2009 | Riley | E04H 1/00 703/1 |
| 2011/0214364 A1* | 9/2011 | Fuller | E04F 17/00 52/302.1 |
| 2024/0164351 A1* | 5/2024 | Rodd | A01G 31/02 |

* cited by examiner

SYSTEM AND METHOD FOR CREATING AND SUSTAINING A COOL MICROCLIMATE IN AN ARTIFICIAL VALLEY, AND USE OF STRUCTURE FOR VALORIZATION AND REMEDIATION OF BAUXITE RESIDUE

FIELD OF THE INVENTION

The present invention provides an opportunity for large-scale valorization and remediation of bauxite residue and other similar waste materials. It involves the use of these materials for the establishment of a land-form that sustains a controlled environment for agricultural and recreational activities in warm, arid climatic conditions. The invented system entails an integration of plant irrigation, substrate remediation, and environmental cooling, aiming at increasing the water use efficiency compared with existing technologies for environmental control or bauxite residue remediation.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Fresh vegetables, fruits, and animal products are vital for a healthy diet, and ensuring a steady supply of locally produced agricultural goods is crucial for food security in the UAE. Over the past years, there has been significant growth in fruit and vegetable cultivation in the Gulf Region, with a notable 32% increase in vegetable production in Abu Dhabi from 2012 to 2016. Across the UAE, domestic vegetable production has been growing annually by 1.2% from 2017 to 2024, driven by a 1.7% increase in domestic demand for vegetables during the same period. To meet the rising demand for high-quality agricultural products, there has been increased investment, both nationally and internationally, in advanced greenhouses, plant factories, and animal production facilities in the UAE. This expansion isn't limited to food production but extends to greening urban areas, providing recreational spaces like parks and gardens for residents and tourists.

However, the environmental conditions in the Gulf Region, characterized by high temperatures and low rainfall, pose challenges to traditional agricultural methods. As a result, various controlled-environment agriculture systems such as shaded greenhouses are commonly used to protect crops from extreme heat and solar radiation. Urban parks and landscapes deploy heat-tolerant plants to sustain greenery year-round, but during the warm season, the high temperatures limit their use for recreational activities. To address this, some areas in the UAE have constructed transparent domes similar to greenhouses to provide recreational urban greenery during the warm season. While greenhouses, nethouses, and indoor air-conditioned spaces are widely utilized to shield plant and animal production from heat and water scarcity, their economic and environmental feasibility in warm climates is limited and remains a concern.

Transparent houses, domes or cylinders for growing plants have in common that they require enormous amounts of energy and/or water for cooling under climatic conditions of the Gulf Region. Greenhouses constitute horticultural infrastructure originally developed for out-of-season (=winter) production of vegetables and fruits in temperate climate. The greenhouse effect causes the interior of a transparent enclosure to warm up, even when outside temperatures are near the freezing point. For this reason, the concept of a greenhouse is contrary to its suitability in hot climates. In greenhouses that use only natural ventilation for cooling, inside temperatures are usually around 15-20° C. above the outside temperature on days with clear sky (Kittas et al., 2003; Sethi and Sharma 2007). Closed foil or polycarbonate tunnels, which are commonly used for protected plant cultivation in the UAE, may heat up even more without appropriate cooling.

Water-saving strategies are crucial for protected plant production in the Gulf Region, where there are approximately 7600 greenhouses in the UAE, with further expansion expected. Despite agricultural modernization, supplying local products still requires significant water and energy, especially during hot months. Agriculture consumes over half of Abu Dhabi's water, contributing to groundwater and soil salinization, raising concerns about depletion by 2030. Greenhouses, originally designed for temperate climates, struggle with high temperatures in the Gulf. Evaporative cooling systems are commonly used but demand large quantities of drinking water, surpassing irrigation needs. Greenhouses may consume excessive high-quality water for cooling, making them unsuitable for arid regions. Developing alternative technologies for protected plant production is urgently needed to conserve water resources.

Despite the unsuitability of traditional greenhouses for arid regions with high solar radiation, there has been limited progress in developing alternatives. While shading covers can reduce heat load, conventional shading methods often reduce the amount of photosynthetically active radiation reaching plants, leading to slower growth and reduced yields. Selective covers that block only near-infrared radiation offer promise for improving water use efficiency, but their effectiveness is limited. Photovoltaic greenhouses, though financially beneficial, do not significantly improve water or energy efficiency. Greenhouses combined with solar stills can produce desalinated water but require substantial energy and water for cooling. Seawater greenhouses have not been widely adopted due to concerns about their energy and water efficiency. Liquid desiccant systems show potential for reducing cooling water needs, but their energy efficiency compared to conventional methods remains uncertain. Plant factories using artificial lighting have limitations due to high energy consumption and restricted crop options. While plant factories are feasible for leafy vegetables and herbs, they face challenges with woody plants and vining vegetables due to their reliance on vertical hydroponic systems and limited crop diversity. Additionally, they cannot integrate animal production systems beyond aquaponics due to their hydroponic nature. Rising energy costs and limited crop variety have rendered many plant factories economically unfeasible.

Groundwater salinization due to agricultural practices is a significant issue in the Gulf Region, particularly in the UAE where most farmers rely on brackish groundwater for irrigation. This has led to increasing salinity levels, affecting around ninety percent of farmers in Abu Dhabi alone. Factors contributing to this include seawater intrusion in coastal areas and over-irrigation inland, exacerbating aquifer salinity and nitrate concentrations. To prevent salt accumulation, farmers often need to apply excessive water, leading to leaching events that must increase as salinity levels rise. To address this, farmers commonly use methods such as desalination of irrigation water or cultivation of salt-tolerant crops. However, desalination is costly and energy-intensive, contributing to CO2 emissions. Alternatively, drainage systems could collect saline leachate instead of it returning to aquifers, but the disposal of saline brine poses environmental risks to marine ecosystems. While some farms have access to high-quality water from municipal sources or treated sewage effluent, these may still contain salt, requiring additional water for leaching, potentially leading to soil salinization. Despite the potential use of salt-tolerant plants or drainage systems, these solutions face limitations. Salt-tolerant plants are not widely applicable to most agricultural systems, and drainage systems are rarely used due to cost concerns. Overall, there is a need for sustainable strategies to mitigate groundwater salinization and manage water resources effectively in agricultural practices in the UAE and other arid environments. It is estimated that more than one third of agricultural land worldwide is affected by elevated soil and groundwater salinity.

There is a pressing need to develop a large-scale strategy for the utilization of bauxite residues. Emirates Global Aluminium (EGA) is a significant contributor to global aluminium production, making the UAE the fifth largest aluminium producing country. The bauxite refining process generates considerable residue, requiring disposal due to its high sodicity and causticity. The EGA aims to valorize these residues produced by its refinery within the next decade, aiming to convert them into marketable products such as soil improvers for UAE agriculture. Despite proposals for various applications, feasible large-scale valorization opportunities remain undeveloped. While some progress has been made in remediating bauxite deposition sites, challenges such as the presence of potentially toxic metals and radioactive materials limit agricultural use. However, bauxite processed in EGA's refinery in Abu Dhabi is expected to have low pH and sodium content, making it suitable for agricultural use. Other potential uses, such as in construction or mineral extraction, have been explored but often deemed economically unfeasible.

Based on the above explained, there exists a need for a sustainable system and method for cultivation to secure future food supply while preserving precious energy and water resources for future generations, and also overcomes the drawbacks of the traditionally employed systems.

SUMMARY OF THE INVENTION

Therefore it is an object of the present invention to propose an artificial valley for creating and maintaining a cool microclimate and a method of enabling the same.

There is disclosed an artificial valley for creating and maintaining a cool microclimate comprising:
- a symmetrical valley structure with terraced inner slopes for cultivating plants and animals;
- a shading roof constructed from reflective roof plates configured for adjusting amount of light intake;
- vertical walls provided with light-reflecting surfaces for diffusely reflecting light on to the terraces; and
- a cooling system for maintaining a temperature gradient between lower and higher terraces by injecting fresh, cool air at a base of the valley, wherein
  the shading roof is tilted towards outer side of the valley for protection from rain or wind; and the cooling system comprises a cooling tower integrated with forced ventilation for evaporative cooling of leached irrigation water (or leachate) draining from the terraces and sprinkling it on the air injected into the valley.

In an embodiment of the present invention, the roof plates of the shading roof are partially overlapping and configured to be tilted around a central axis for being adjusted in position relative to the sun to dose and direct light supply to the different terraces.

In another embodiment of the present invention, the height of the roof plates increases asymptotically towards centre of the valley.

In an embodiment of the present invention, the shading roof of the artificial valley is constructed from a cascade of long, double-sided mirror panels mounted to pylons.

In an embodiment of the invention, the artificial valley further comprises a mesh or a net between the roof plates for reducing intake of air/wind, insects, and birds into the valley.

In another embodiment of the present invention, the shading roof has openings in its upper part over uppermost terraces to allow warm air inside the valley to escape as the fresh cool air is being injected at the base of the valley.

In an embodiment of the present invention, the artificial valley further comprises a leachate collection for collecting and storing of the leached irrigation water (or the leachate) draining from the terraces and then directing to the cooling tower.

In another embodiment of the present invention, the base of the valley is provided with airducts for injecting air from outside into the valley and the air is cooled inside the ducts before injection, by sprinkling the leachate from the cooling tower on it. This technique also serves in reducing the insect and dust load of the inflowing air.

In an embodiment of the present invention, the cooling tower releases heat from the leachate above the valley and circulates the leachate after cooling into the air ducts provided at the base of the valley for being sprinkled on to the air passing through the ducts and then recirculates the leachate back to the cooling tower for heat release.

In another embodiment of the present invention, the cooling tower is located in an approximately 10 m wide shaft between the valley and its neighbouring valley, built in parallel to each other.

In an embodiment of the present invention, the artificial valley further comprising a permeable material to be used as a filling material for the valley wherein the permeable material comprises a bauxite waste residue or a similar waste material.

In another embodiment of the present invention, the valley has a length of 300 m and a width of 80 m, lined by a concrete wall of a height of 15-30 m.

In an embodiment of the present invention, the artificial valley wherein the lower terraces with cool temperature, owing to the fresh, cool air injected at the base, are used for cultivating heat-sensitive crops or farm animals, and for recreational activities, whereas the higher terraces with temperature higher than the lower terraces, are used for cultivating heat-tolerant crops.

In another embodiment of the present invention, the valley is provided with access through narrow sides of the valley and elevators for movement between the terraces.

There is disclosed a method for creating and maintaining a cool microclimate in an artificial valley comprising providing a symmetrical valley structure with terraced inner slopes for cultivation of plants and animals; adjusting position of reflective roof plates of a shading roof relative to the sun for controlling light supply to different terraces; providing light-reflecting surfaces for vertical walls for enabling diffuse reflection of light on to the terraces; and integrating a cooling system for maintaining a temperature gradient between lower and higher terraces by injecting fresh, cool air at a base of the valley, wherein the shading roof is tilted towards outer side of the valley for protecting the valley from rain or wind; and the air injected into the valley is cooled by leached irrigation water (or leachate) drained from the terraces, after the latter being evaporatively cooled by the cooling system and sprinkled on to the air at the base of the valley.

In an embodiment of the present invention, wherein the reflective roof plates of the shading roof, partially overlap each other and tilt around a central axis to direct and dose the light supply.

In another embodiment of the present invention, wherein warm air inside the valley is forced out through openings of the shading roof in its upper part over uppermost terraces, by injecting fresh, cool air at the base of the valley.

In an embodiment of the present invention, wherein the leached irrigation water (or the leachate) draining from the terraces is collected and stored by a leachate collection and then directed to the cooling tower.

In another embodiment of the present invention, wherein air from outside is injected into the valley through airducts provided at the base of the valley and the air is cooled inside the ducts before injection, by sprinkling the leachate from the cooling tower on it.

In an embodiment of the present invention, wherein the cooling tower releases heat from the leachate above the valley and circulates the leachate after cooling into the air ducts provided at the base of the valley, for being sprinkled on to the air passing through the ducts and then recirculates the leachate back to the cooling tower for heat release.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of the proposed artificial valleys for a sustainable cool microclimate and remediation of bauxite residue-according to the present invention will be described in conjunction with FIGS. 1-6. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes artificial valleys for creating and sustaining a cool microclimate for agricultural, recreational, or residential purposes in warm climatic zones. The invention aims to address the unsuitability of hot, desert environmental conditions for open-field agricultural production and urban greenery cultivation. Artificial valleys are an alternative technology to conventional greenhouses, net houses, glass domes and air-conditioned indoor spaces that have poor economic and environmental feasibility in warm climatic zones. The significance of the invention is that it creates and sustains a cool microclimate without trapping heat like greenhouses or glass domes do. It can be constructed as a landform for protected agricultural plant production, farm animal husbandry, and provision of greenified recreational spaces. The artificial valleys can be constructed from bauxite residue or other unconsolidated substrates of poor quality, thus offering an opportunity for valorization and remediation of such materials. The technology exercises sustainable environmental control in order to achieve a secured food supply while preserving precious energy and water resources.

Artificial valleys are designed to achieve and sustain a cool microclimate by supporting the retention of cool air at their base rather than trapping heat as in the greenhouse effect. The structure of a valley, according to the invention, is symmetrical with terraced inner slopes and having a length several times greater than its width. The valley is lined by a concrete wall and covered by a shading roof. The roof is constructed from reflective plates mounted to pylons and provided with fine mesh/net between the plates. The height of the roof plates increases asymptotically towards the centre of the valley. The reflective roof plates are arranged to be partially overlapping and they can be tilted around a central axis to direct and dose light intake according to the position of the sun. Slight tilting of the shading roof towards the outer side of the valley protects the structure from heavy rainfall and/or wind. Vertical walls of terraces have light-reflecting surfaces for diffused reflection of light that enters the valley. The terraces of the inner slopes and the base are used for irrigated plant cultivation.

The invention proposes a cooling system operating on saline water, which supplies fresh, cooled air at the base of the valley. The system is implemented using evaporative cooling towers with forced ventilation. Leachate draining from the plant production in the valley is evaporatively cooled in a cooling tower, and then sprinkled through the air that is blown into the valley. The cool air is injected into valleys at their base which forces out the warm air inside the valleys through the roof openings. The warm water after cooling the air, circulates back to the cooling tower to release heat above the valley. The cooling tower receives air for cooling from air ducts in the upper terraces and also supplies air to be blown into the valley. The system enables valleys to sustain a temperature gradient between lower and higher terraces, allowing for the cultivation of heat-sensitive crops or farm animals on cooler lower terraces.

Plants are cultivated in field soil, while the body of the valley may be filled with a waste material, such as bauxite residues, providing an opportunity for large-scale valorization and remediation of such materials. Bauxite residues (due to thermal properties) insulate the inner part of the valley against warmer outside temperatures.

Unlike traditional agricultural systems, the valleys collect the leachate for evaporative cooling and do not redirect it back to aquifers. This, in turn results in dual benefits of preventing salt and agrochemical residue return to groundwater bodies and preventing an increase in groundwater tables. Consequently, the proposed valleys may sustainably operate on relatively low-quality irrigation water including brackish groundwater or treated sewage effluent (TSE) . . . . More importantly, the artificial valleys provide a protected environment for plant production at lower water and energy costs compared to conventional greenhouses and glass domes.

Figure 1:
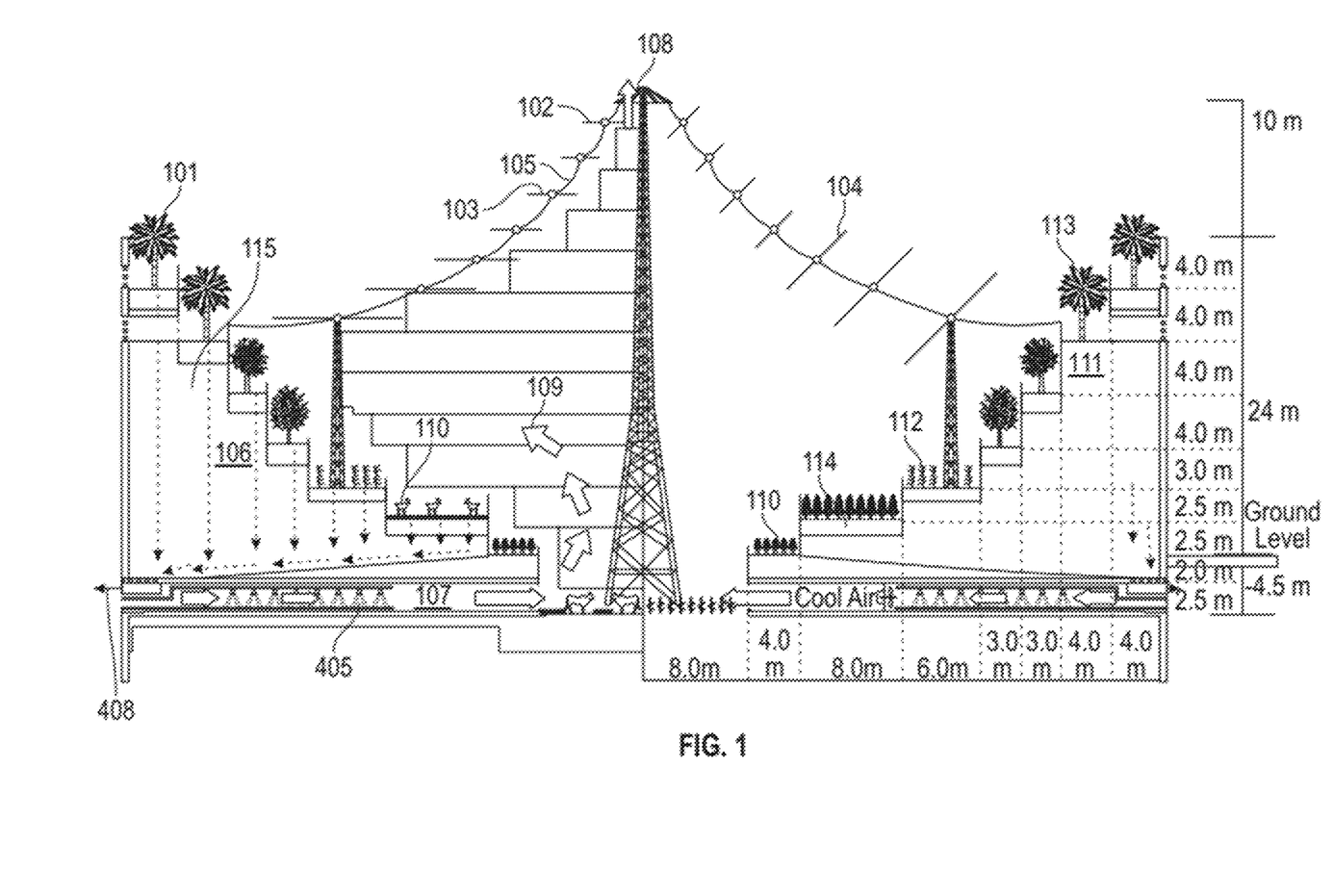
FIG. 1 shows traverse section through an artificial valley, in accordance with the present invention.

Now simultaneously referring to FIGS. 1 to 4C, the various embodiments of the artificial valleys for sustainable microclimate are elaborated below. FIG. 1 shows the traverse section of an artificial valley. In an embodiment of the present invention, artificial valleys are invented as a landform wherein the valleys are symmetrical with terraced inner slopes. They are designed such that their length can be several times greater than their width. In an embodiment, the proposed valley has a length of 300 m or more, a width of 80 m and height of 34 m above the ground level and extending to 4.5 m below the ground level, provided with multiple symmetrical terraces of height ranging from 2 m to 4 m, and width ranging from 3 m to 8 m, their length being the same as the length of the valley. However, other dimensions are possible. The artificial valleys are lined by a concrete wall (101). The wall has a height of 15-30 m above ground surface. The inner part of the valley has the shape of a half-pipe that is open to the top. The terraces of the inner slopes and the base are used for irrigated plant cultivation.

Figure 2A:
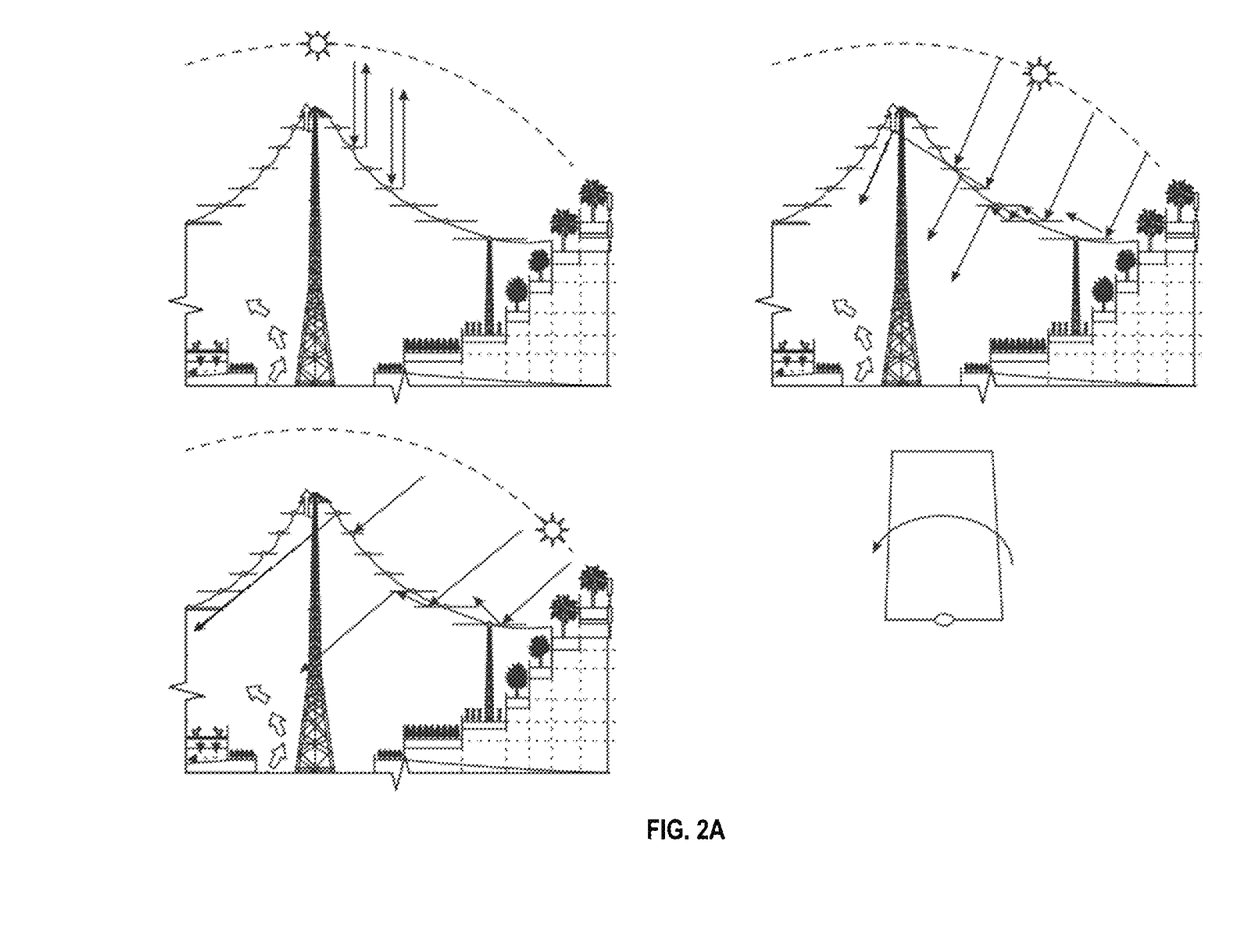
FIG. 2A shows light transmission through the closed shading roof, depending on the position of the sun/time of day, in accordance with the present invention.

To minimize temperature exchange between the inside and outside of the valley, the latter is covered by a shading roof. In an embodiment of the present invention, the roof is made of reflective plates, constructed from a cascade of long, double-sided mirror stripes mounted to pylons, indicated as 102 in the figure. The height of the roof plates is designed to increase asymptotically towards the center of the valley, as illustrated in FIG. 1. The plates are partially overlapping and can be tilted around a central axis to dose and direct light intake. As a result, by adjusting the position of the reflective roof plates relative to the sun, the light supply to different terraces can be adjusted depending on the requirements of the plants and the overall temperature inside the valley. In FIGS. 1, 103 and 104 represent shading cover closed and shading cover open respectively. FIG. 2A illustrates transmission of light through the closed shading roof, depending on the position of the sun/time of day. Roof plates are made of smooth, double-sided mirrors that can be tilted around a central axis towards the center of the valley. The figure clearly shows how this function is used to direct and dose light intake, according to the position of the sun.

Figure 2B:
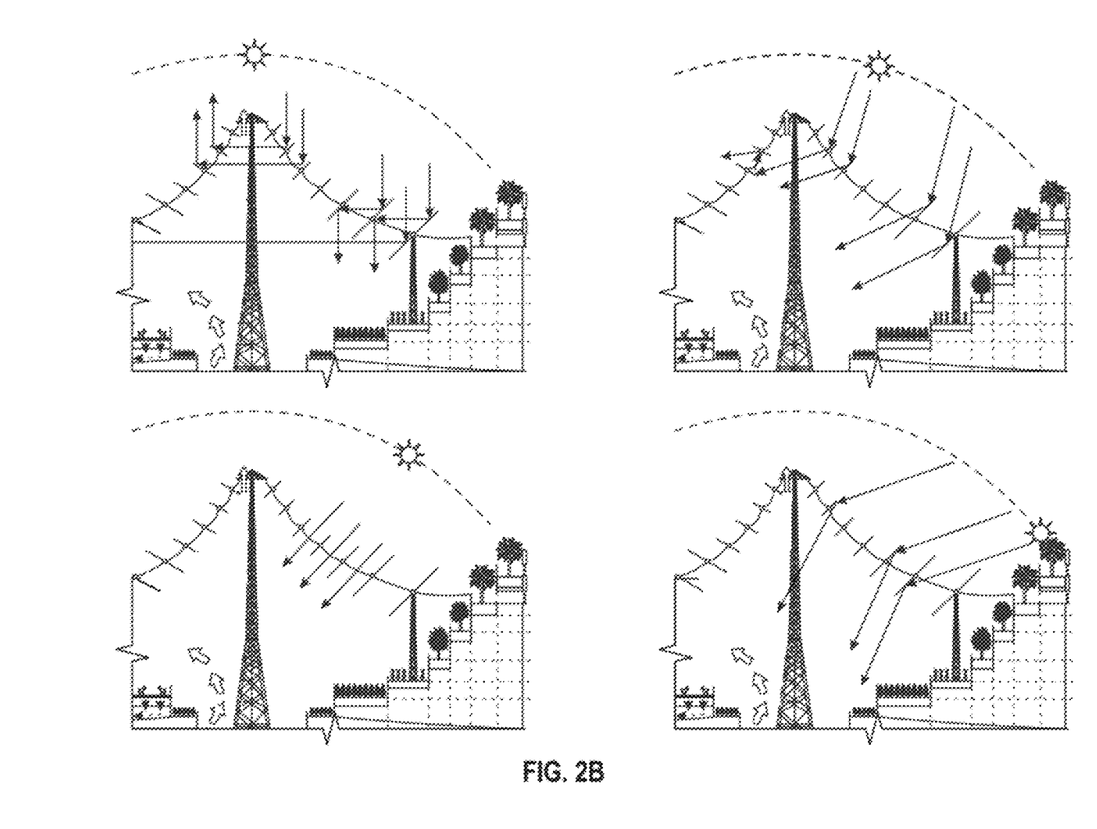
FIG. 2B shows transmission of light through the open shading cover depending on the position of the sun, according to the present invention.

Similarly, FIG. 2B illustrates transmission of light through the open shading cover, depending on the position of the sun/time of the day. The roof plates are arranged in an overlapping manner such that the base of the valley would not receive direct light at midday, even when the shading cover is open.

Figure 2C:
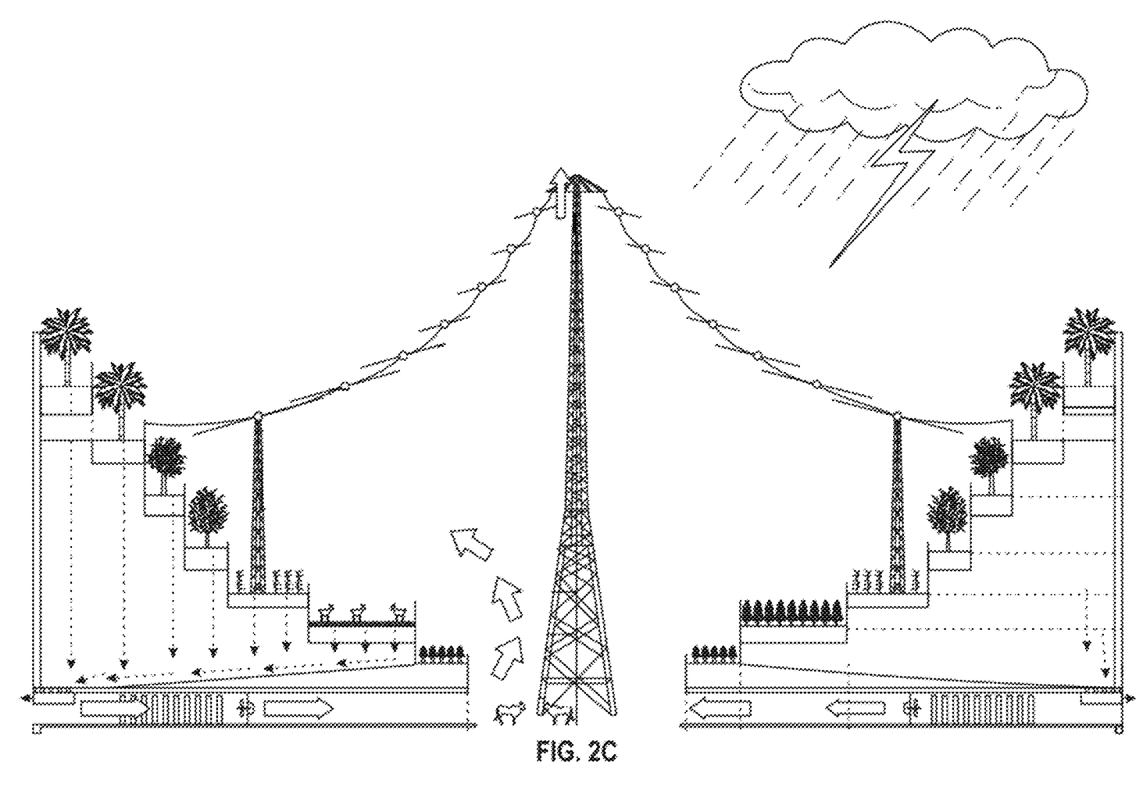
FIG. 2C shows the slight tilting of the shading roof towards the outer side of the valley that temporarily protects the structure from heavy rainfall and/or wind, in accordance with the present invention.

In an embodiment of the present invention, the gaps/area between the roof plates are covered by a fine, narrow mesh or net, made of nylon or steel that reduces air exchange or wind between the inside and the outside of the valley. The net also reduces entry of birds and insects into the valley from outside. 105 indicates light-transmitting net in FIG. 1. The openings in the upper part of the shading roof will allow warm air inside the valley to escape. The shading cover does not extend over the two uppermost terraces, which thus do not provide protected agricultural land and can be planted with date palms (113). In an embodiment of the invention, the mirror stripes are slightly tilted towards the outer side of the valley, which can temporarily protect the interior of the structure during heavy storms. FIG. 2C clearly shows slight tilting of the shading roof towards the outer side of the valley that temporarily protects the structure from heavy rainfall and/or wind.

Figure 3:
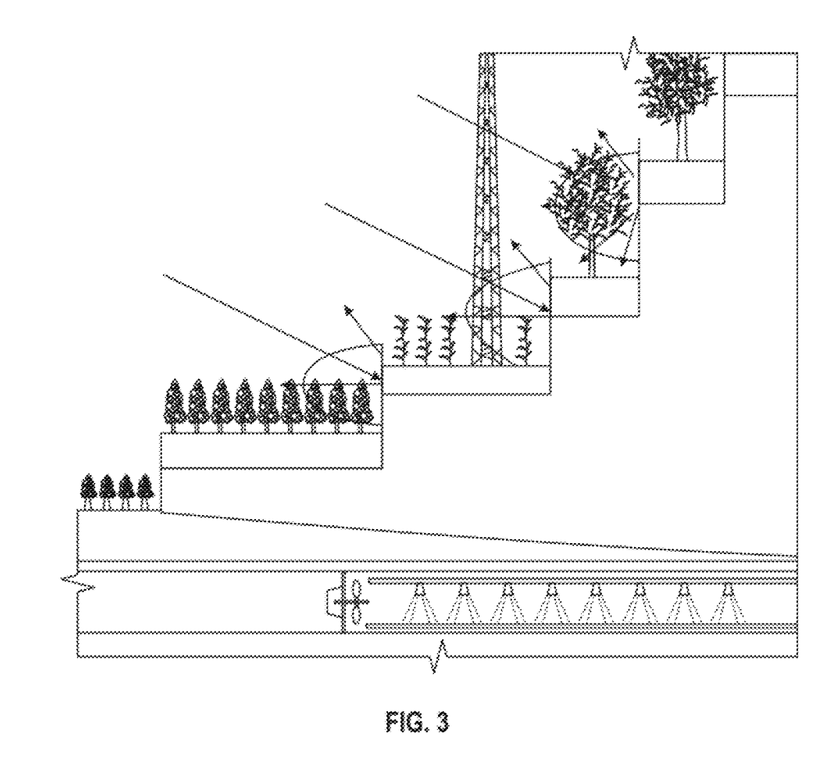
FIG. 3 shows diffuse reflection of light on silver surfaces of vertical walls that reduces heat evolution and increases the amount of visible light falling into the plant stands.

In another embodiment of the invention, the vertical walls that form the terraces in the valley are provided with silver, light-reflecting surfaces to reduce heat evolution. This would also increase the amount of visible light that the plants receive. As shown in FIG. 3, the light undergoes diffused reflection as it falls on the silver surfaces of vertical walls. This phenomenon enables less heat to be evolved inside the valley, at the same time, increasing the amount of visible light which is the diffuse light, falling into the plant stands.

In an embodiment of the invention, the artificial valleys are provided with a cooling system can operate on saline water. This cooling system is intended to sustain cool air that is injected into valleys at their base. According to the present invention, the cooling system disclosed herein, as shown in FIG. 1, operates on irrigation water that percolates beneath the rooting zone of the plants (also called leachate) (106), draining from the terraces towards the base of the valley. The base of the valley will be supplied with fresh air that is sucked into the valley as the warm air (108) formed inside the valley rises up and escapes through the top of the roof. The fresh air blown into the valley (408), passes through underground air ducts (107), provided at the base. In the present invention, the ducts are 2.5 m wide at the cross section. Within these ducts (107), the air is cooled by sprinkling cold leachate water (405) for the removal of heat, increase of moisture, and to repel pest. Warm air inside the valley (108), rises to the upper parts of the valley and is forced out of the protected area as the new cool air (109) is injected from below. Thus, a temperature gradient between lower and higher terraces is sustained. The temperature gradient maintained between the lower and upper terraces enables cultivation of a wide variety of crops suitable for different temperature. Lower terraces with cooler temperature can be used for the cultivation of heat sensitive crops or greenhouse crops (110) as well as free ranging farm animals (110). They can also be used for recreational activities, such as sports facilities, gardens or parks. Terraces at a higher level can be used for the cultivation of fruit trees (111), such as citrus, bananas, figs, olives or mangoes. Terraces at moderate or middle level, with intermediate temperature in between that of lower and higher levels, can be used for other field crops or animal feed (112). Unprotected terraces with highest temperature at the top most level of the valley can grow heat-resistant crops like date palms (113).

Figure 4A:
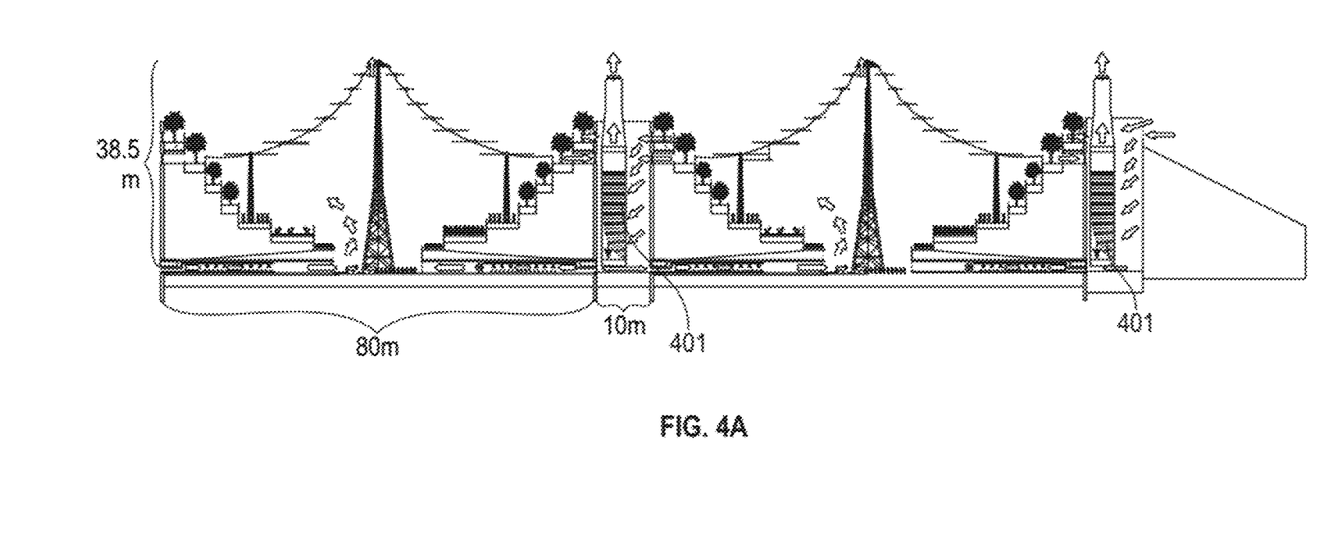
FIG. 4A shows traverse section through two artificial valleys with the cooling towers located between them, in accordance with the present invention.
Figure 4B:
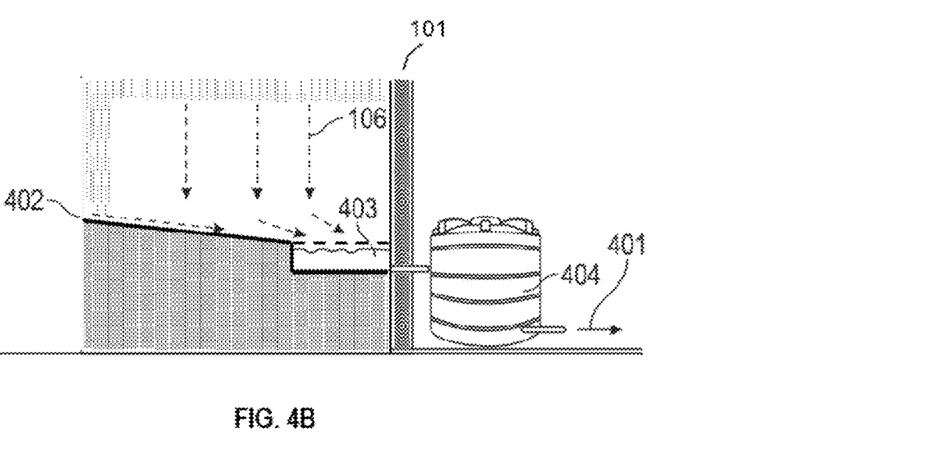
FIG. 4B shows traverse section of the leachate collection system, in accordance with the present invention.
Figure 4C:
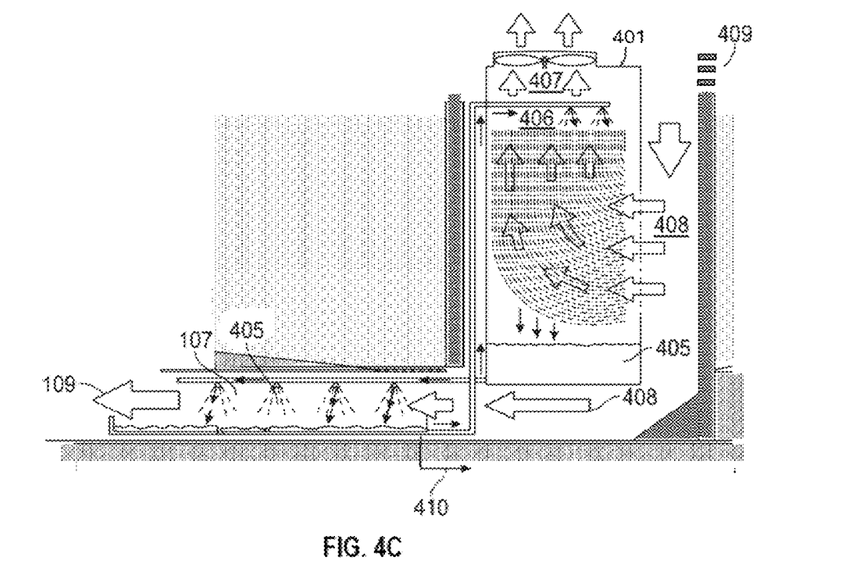
FIG. 4C shows traverse section of the cooling system, in accordance with the present invention.

In an embodiment of the invention, the valleys are provided with systems wherein the leachate is subjected to an evaporative cooling method. The system comprises of storage for the leachate draining out of the valleys and evaporative cooling towers. Evaporative cooling towers with forced ventilation are located in close proximity with each valley. In an embodiment, the towers are located in approximately 10 m wide shafts between two neighboring valleys. FIG. 4A shows a traverse section through two artificial valleys with the cooling towers (401) located between them as well as between the valley at the boundary and a sand dune. Leachate draining from the plant production systems in the valley is collected and stored in water tanks. This leachate is used for evaporative cooling when the air temperature at the base of the valley exceeds a certain threshold value and is then used for collecting heat from the air that is blown into the valley. FIG. 4B and FIG. 4C shows the traverse section of the leachate collection and cooling systems respectively. Referring to FIG. 4B, a water impermeable layer is provided at the base of the valley with a slope to it such that the leachate (106) is drained towards a leaching water collection (403) at the end of the slope. The collected water is then stored in a water tank (404) and is then, directed to the cooling tower (401) where the leaching water is first evaporatively cooled. The cold leachate water (405) from the cooling tower is then sprinkled through the air that moves through the underground air duct (107). Air that is blown into the valley passes through this sprinkle of cold leachate water (405) for the removal of heat, increase of moisture, and to repel pests. As the air is cooled, the water is warmed up and the hot water (406) is returned to the cooling tower (401). The latter would release the heat/hot air (407) above the valley. The cooling tower receives air for cooling (408) from air ducts (409) in the upper terraces of the valley. Air to be cooled and blown into the valley (408), is also obtained from there. Brine or salt from the leachate water that gets deposited at the bottom of the duct (107) in the process of leachate cooling the air, is removed from the duct for its (brine/salt) disposal (410).

In an embodiment of the present invention, the artificial valley is made from water-permeable soil or residue material as filling material. An artificial valley that is 300 m long and 80 m wide, as in the present embodiment requires around 300.000 t of a water-permeable soil or mineral substrate to be built/filled. Desert dune sand can be used as filling material, but sourcing and transporting of such large amounts of material might impose high costs. The present disclosure proposes in an embodiment, that waste materials such as bauxite residues are used in the construction of the valleys. The valley is constructed using bauxite residue as filling material, while the terraces use fertile soil to form its cultivable layers, which can be the original soil at the site itself. In FIG. 1, the plants are cultivated in field soil (114), while the body of the valley is filled with a waste/filling material (115), such as bauxite residues (115). Waste residue material requires loading and transportation to deposition sites anyway. Instead of being deposited non-productively at conventional dumping sites, it might as well be deposited into the artificial valleys. Thermal properties of bauxite residues are more favorable with respect to their capacity to insulate the inner part of the valley against warmer outside temperatures. Through its use as a filling material for artificial valleys, bauxite residues can be remediated. Bauxite residues can be physical modified prior to being used in the construction of the valleys to improve its permeability. Remediation of bauxite residues via artificial valleys requires it to be permeable that irrigation water draining from the agricultural terraces percolates through the bauxite residue strata and the material can be modified or mixed with other materials accordingly, before being used for filling of the artificial valleys.

FIG. 1 also shows an agricultural use of the valley. Plants are cultivated in field soil (114), while the body of the valley is filled with a waste material, such as bauxite residues (115). The terraces of the inner slopes and the base are used for irrigated plant cultivation. Irrigation water draining from the cultivated terraces is collected and used for evaporative cooling of fresh air that is injected at the base of the valley. The valley is expected to sustain a temperature gradient between the lower and higher terraces. Cooler parts at the base of the valley and lower terraces can be used for production of heat sensitive crops or greenhouse crops (110) as well as farm animals (110) preferable free range animals. The valley can also host parks and gardens providing recreational or sports facilities that could be used year-round. Terraces at a higher level can be used for the cultivation of fruit trees (111), such as citrus, bananas, figs, olives or mangoes. Terraces at moderate or middle level, with intermediate temperature in between that of lower and higher levels, can be used for other field crops or animal feed (112). The shading cover does not extend over the two uppermost terraces, which thus do not provide protected agricultural land and can be planted with heat-resistant crops like date palms (113).

Figure 5:
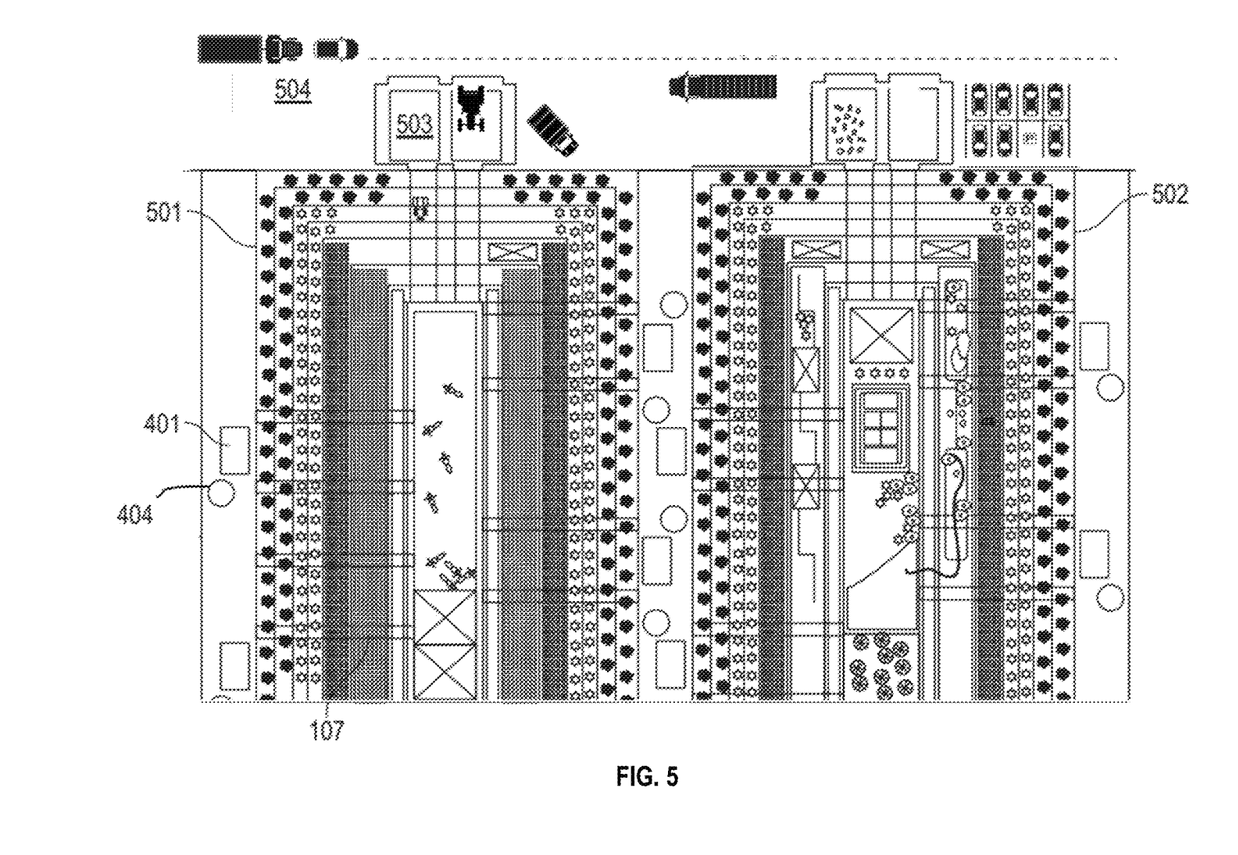
FIG. 5 shows two neighbouring valleys seen from the top (without shading roof) and their narrow endings, in accordance with the present invention.

FIG. 5 represents an embodiment of the invention, showing the narrow endings of two neighboring valleys seen from the top (without shading roof). The valley on the left (501) is used for agricultural production, while the one on the right (502) serves agricultural as well as recreational purposes. The valleys will be accessed from their narrow sides using access roads (504). Elevators (503) are provided to transport workers, machinery and materials between the terraces. Two or more valleys can be built in parallel, allowing for counter-stabilization of the concrete walls.

Figure 6:
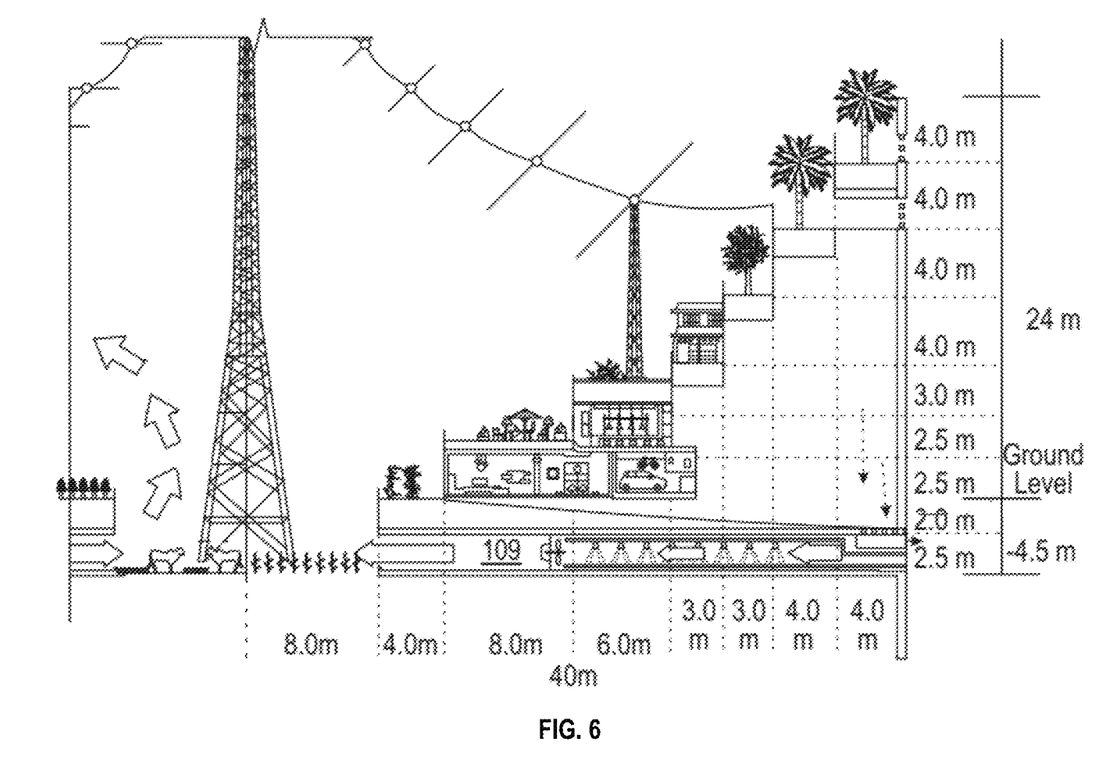
FIG. 6 illustrates integration of residential or commercial buildings into the artificial valleys, in accordance with an embodiment of the present invention.

The invention suggests variable use for agricultural, recreational or residential purposes. The cool microclimate that the artificial valleys provide conditions suitable not only for farming, but also other purposes that involve the cultivation of plants which comprises recreational or educational parks and gardens, sports facilities or wildlife conservation. The disclosure also proposes an embodiment wherein artificial valleys have residential or commercial buildings integrated in to them. FIG. 6 illustrates how residential or commercial buildings can be integrated into the artificial valleys.

Benefits of the proposed artificial valleys with sustainable microclimate, in accordance with the present invention include (1) the valleys do not return salt and/or agrochemical residues to groundwater bodies. As leaching water is collected and used for evaporative cooling, leachate draining from cultivated topsoil will not return to groundwater bodies. Different from most other agricultural systems using brackish water for irrigation, the proposed solution does not aggravate groundwater salinity. (2) No increase in groundwater tables. Groundwater table rise is a major threat to buildings and agricultural systems in many places, including urban areas of the UAE. Since the artificial valleys do not return leaching water back to the aquifers, they do not contribute to groundwater table rise. (3) Operation of the system on relatively low-quality irrigation water, including brackish groundwater and treated sewage effluent (TSE). In consequence of points (1) and (2), the proposed valleys are well suitable for plant production under brackish water or TSE irrigation. Both practices require regular over-supply of irrigation water for leaching of salts. In conventional agricultural systems this constitutes a waste of water and energy. In our system, however, the leaching water is valorized in two ways once it has left the agricultural system. First it removes excessive causticity and sodicity from bauxite residues as it percolates through the deeper substrate strata, and second it serves in cooling once it has drained out from the soil. (4) Provision of a protected environment for plant production at lower water and energy costs compared with conventional greenhouses. Different from greenhouses, artificial valleys will provide a protected room for plant cultivation without supporting the greenhouse effect. The valleys are rather designed to support the retention of cool air at their base. This would lower water and energy requirements for plant production compared with techniques currently used for plant production in the UAE and other parts of the world that have similar climate. (5) Large-scale valorization and remediation of waste materials, such as bauxite residues. Bauxite residues and possibly other waste materials could be valorized at a large scale by being used as a filling/construction material for the proposed artificial valleys. Fresh bauxite residues are often considered hazardous waste, due to their sodic and caustic nature, and stored on designated dumping sites. In temperate climate these dumping sites may naturally remediate over time, as rain washes excessive NaOH away, and a natural vegetation cover can gradually establish on the deposition sites. Under arid climatic conditions this process may not readily occur, and conventional deposition sites might require continuous input of water only to prevent the evolution of alkaline dust. The proposed use of bauxite residues as filling material for artificial valleys would overcome all these limitations, and not only pose a valorization, but also a remediation strategy for this material under hot, dry climatic conditions of the arid regions such as Gulf Region. (6) Variable use for agricultural, recreational or residential purposes. The cool microclimate that the artificial valleys provide might constitute an attractive outdoor environment during the warm season in the UAE and other countries of the Gulf Region not only for farming, but also other purposes that involve the cultivation of plants. These might involve recreational or educational parks and gardens, sports facilities or wildlife conservation. It might also be possible to integrate building structures into the valleys.

The significance of the present invention is that it facilitates greater sustainability of food supply, urban greenery and tourism sector in regions with warm, hyper-arid environments like UAE. Plant cultivation on farms and in gardens and parks is essential to food security, the wellbeing of residents, and the tourism industry of these countries. Global warming is expected to aggravate water scarcity, soil salinization, and exposure of agricultural systems to heat stress in many regions of the world. The concept of an artificial valley proposed herein, for protection of plant and animal production systems against excessive heat and solar irradiation, requires less water and energy than currently available alternative technologies. It thus supports food security worldwide, and facilitates sustainable urban greenery, and the tourism sector of the hot climatic countries like UAE.

Also, the present invention provides an opportunity for large-scale valorization of bauxite residue. The use of bauxite residues for the construction of the proposed artificial valleys constitutes a large-scale valorization and remediation concept for this material. Companies require large-scale deposition and valorization strategies for bauxite residue or other unconsolidated mineral materials. In recent years, the GCC countries have seen an enormous investment into state-of-the-art aluminium and alumina smelters and refineries. The GCC region currently contributes around 8% to global aluminium production. The UAE produces around 3 million t of bauxite residue per year. There is a need to develop strategies for valorization of this material into agricultural soil amendments or construction materials, and the proposed artificial valleys enable large-scale valorization and remediation that is economically and environmentally feasible.

A valley of 80 m diameter and 300 m length would provide approximately as much protected cultivable land as 80 standard size greenhouses. Economic feasibility of valleys arise from lower operational costs, valorization of bauxite residues or other waste materials in their construction, greater environmental sustainability, and a more versatile use of the structure.

Bauxite residues may be treated for physical modification prior to being used in the construction of the valleys. Remediation of bauxite residues via artificial valleys requires it to be permeable that irrigation water draining from the agricultural terraces percolates through the bauxite residue strata. The material can be modified or mixed with other materials to improve its permeability before being used for filling of the artificial valleys.

The current invention finds application in the agricultural and real estate sectors. The development and provision of urban green spaces has a great impact on the value of residential and touristic real estate in the warm, arid climatic regions (like Gulf Region). Between 2018 and 2023 the number of residential units has increased by 25% in Dubai, and by around 7% in Abu Dhabi), with Dubai providing the fastest growing market for luxury real estate in the world. Maintenance of this upward trend will only be possible when paralleled by a concomitant expansion of urban greenery. This, however, might be increasingly threatened by the availability of irrigation water of sufficient quality. When integrated into urban living environments, the proposed artificial valleys can provide green spaces that can be used year-round and at a lower long-term environmental impact compared with currently deployed concepts for urban greenery.

The proposed invention is of interest to companies requiring large-scale deposition and valorization strategies for bauxite residue or other unconsolidated mineral materials. In recent years, the GCC countries have seen an enormous investment into state-of-the-art aluminium and alumina smelters and refineries. The GCC region currently contributes around 8% to global aluminium production. The UAEs Emirates Global Aluminium produces around 3 million t of bauxite residue per year. The proposed artificial valleys facilitate large-scale valorization and remediation strategy that is economically and environmentally feasible.

The current invention is of great application value to agricultural companies. Food security is a national priority of the UAE and other GCC states, and the regional domestic agricultural sector has greatly expanded since 2018. However, despite a strong recent focus on investment into 'Agri-Tech', the global agricultural sector remains characterized by a lack of innovation and stagnation in the development of feasible production technologies tailored to specific climatic and socio-economic environments. In face of global population growth, climate change, and increasing scarcity of natural resources, innovation in agricultural production technologies needs to rapidly extend far beyond technical gimmicks.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. An artificial valley for creating and maintaining a cool microclimate comprising:
   a symmetrical or asymmetrical valley structure with terraced inner slopes for cultivating plants and animals;
   a shading roof constructed from reflective roof plates configured for adjusting amount of light intake;
   vertical walls provided with light-reflecting surfaces for diffusely reflecting light on to the terraces; and
   a cooling system for maintaining a temperature gradient between lower and higher terraces by injecting fresh, cool air at a base of the valley,
   wherein
   the shading roof is tilted towards outer side of the valley for protection from rain or wind;
   the cooling system comprises a cooling tower integrated with forced ventilation for evaporative cooling of leached irrigation water or leachate draining from the terraces and sprinkling the leachate from the cooling tower on the air injected into the valley, resulting in removal of heat from the air injected into the valley;
   the cooling tower receives air for cooling from air ducts in upper terraces of the valley and supplies the received air to be cooled and blown into the valley;
   the cooling tower is positioned in a shaft between two neighboring valleys to release heat above the valleys; and
   a water impermeable layer is provided at the base of the valley with a slope and the leached irrigation water or leachate is drained towards a leaching water collection at the end of the slope.

2. The artificial valley of claim 1, wherein the roof plates of the shading roof are partially overlapping and configured to be tilted around a central axis for being adjusted in position relative to the sun to dose and direct light supply to the different terraces.

3. The artificial valley of claim 2, wherein height of the roof plates increases asymptotically towards center of the valley.

4. The artificial valley of claim 2, wherein the shading roof is constructed from a cascade of long, double-sided concave mirror stripes mounted to pylons.

5. The artificial valley of claim 2, further comprising a mesh or a net between the roof plates for reducing intake of air/wind, insects, and birds into the valley.

6. The artificial valley of claim 1, wherein the shading roof has openings in its upper part over uppermost terraces to allow warm air inside the valley to escape as the fresh cool air is being injected at the base of the valley.

7. The artificial valley of claim 1, wherein the leaching collection is for collecting and storing of the leached irrigation water or leachate draining from the terraces and then directing to the cooling tower.

8. The artificial valley of claim 1, wherein a base of the valley is provided with underground airducts for injecting air from outside into the valley and the air is cooled inside the underground airducts before injection, by sprinkling the leachate from the cooling tower on it.

9. The artificial valley of claim 8, wherein the cooling tower releases heat from the leachate above the valley and circulates the leachate after cooling into the underground airducts provided at the base of the valley for being sprinkled on to the air passing through the underground airducts and then recirculates the leachate back to the cooling tower for heat release.

10. The artificial valley of claim 9, wherein the cooling tower is located in an approximately 10 m wide shaft between the valley and its neighboring valley, built in parallel to each other.

11. The artificial valley of claim 1, further comprising a permeable material to be used as a filling material for the valley wherein the permeable material comprises a bauxite waste residue.

12. The artificial valley of claim 1, wherein the valley has a length of 300 m and a width of 80 m, lined by a concrete wall of a height of 15-30 m.

13. The artificial valley of claim 1, wherein the lower terraces with cool temperature, owing to the fresh, cool air injected at the base, are used for cultivating heat-sensitive crops or farm animals, and for recreational activities, whereas the higher terraces with temperature higher than the lower terraces, are used for cultivating heat-tolerant crops.

14. The artificial valley of claim 1, wherein the valley is provided with access through narrow sides of the valley and elevators for movement between the terraces.

15. A method of creating and maintaining a cool microclimate in an artificial valley comprising:
   providing a symmetrical valley structure with terraced inner slopes for cultivation of plants and animals;
   adjusting position of reflective roof plates of a shading roof relative to the sun for controlling light supply to different terraces;
   providing light-reflecting surfaces for vertical walls for enabling diffuse reflection of light on to the terraces; and
   integrating a cooling system for maintaining a temperature gradient between lower and higher terraces by injecting fresh, cool air at a base of the valley;
   wherein
   the shading roof is tilted towards outer side of the valley for protecting the valley from rain or wind;
   the cooling system comprises a cooling tower integrated with forced ventilation, and the air injected into the valley is cooled by leached irrigation water or leachate drained from the terraces, after the latter being evaporatively cooled by the cooling tower and sprinkled on to the air at the base of the valley;
   the cooling tower receives air for cooling from air ducts in upper terraces of the valley and supplies the received air to be cooled and blown into the valley;
   the cooling tower is positioned in a shaft between two neighboring valleys to release heat above the valleys; and
   a water impermeable layer is provided at the base of the valley with a slope and the leached irrigation water or leachate is drained towards a leaching water collection at the end of the slope.

16. The method of claim 15, wherein the reflective roof plates of the shading roof, partially overlap each other and tilt around a central axis to direct and dose the light supply.

17. The method of claim 15, wherein warm air inside the valley is forced out through openings of the shading roof in its upper part over uppermost terraces, by injecting fresh, cool air at the base of the valley.

18. The method of claim 15, wherein the leached irrigation water or leachate draining from the terraces is collected and stored by a leachate collection and then directed to the cooling tower.

19. The method of claim 15, wherein air from outside is injected into the valley through underground airducts provided at the base of the valley and the air is cooled inside the underground airducts before injection, by sprinkling the leachate from the cooling tower on it.

20. The method of claim 19, wherein the cooling tower releases heat from the leachate above the valley and circulates the leachate after cooling into the underground airducts provided at the base of the valley, for being sprinkled on to the air passing through the underground airducts and then recirculates the leachate back to the cooling tower for heat release.

\* \* \* \* \*